United States Patent [19]
Kostrivas et al.

[11] Patent Number: 5,711,910
[45] Date of Patent: Jan. 27, 1998

[54] METHOD FOR MAKING A STACKABLE CONTAINER FORMED BY A NOZZLE HAVING AN OFFSET GATE

[75] Inventors: Charles W. Kostrivas, Wauwatosa; Bernard N. Spiegelberg, Germantown, both of Wis.

[73] Assignee: Tulip Corporation, Milwaukee, Wis.

[21] Appl. No.: 558,408

[22] Filed: Nov. 16, 1995

[51] Int. Cl.[6] .................................. B29C 45/32
[52] U.S. Cl. ..................... 264/328.16; 425/572; 425/573
[58] Field of Search ........................... 425/572, 573, 425/549; 264/328.16

[56] References Cited

U.S. PATENT DOCUMENTS

| | | | |
|---|---|---|---|
| 3,995,008 | 11/1976 | Spiegelberg | 425/573 |
| 5,227,181 | 7/1993 | Knudsen | 425/549 |

FOREIGN PATENT DOCUMENTS

| | | | |
|---|---|---|---|
| 186413 | 7/1986 | European Pat. Off. | 425/573 |

OTHER PUBLICATIONS

INCOE Corporation Brochure entitles "Molding Systems and Specialized Tooling for the Plastics Industries" dated Sep. 28, 1992, selected pages.

Mold-Masters Brochure entitled "The Master-Shot® Hot-Edge® Gating System" dated Oct. 1985, selected pages.

*Materials and Processes in Manufacturing*, "Nonmetallic materials: plastics, elastomers, ceramics," E. Paul DeGarmo, 5th Edition, 1979, pp. 208-242.

*Primary Examiner*—Tim Heitbrink
*Attorney, Agent, or Firm*—Foley & Lardner

[57] ABSTRACT

A method and apparatus for forming stackable plastic battery containers having stacking grooves is disclosed. A hot tip injection nozzle is centrally located within a raised section of a die thereby forming a depression within the stacking grooves. The nozzle has a gate offset from the nozzle center line. In this manner, the gate remnant formed by the gate offset does not interfere with the stacking of the containers.

6 Claims, 4 Drawing Sheets

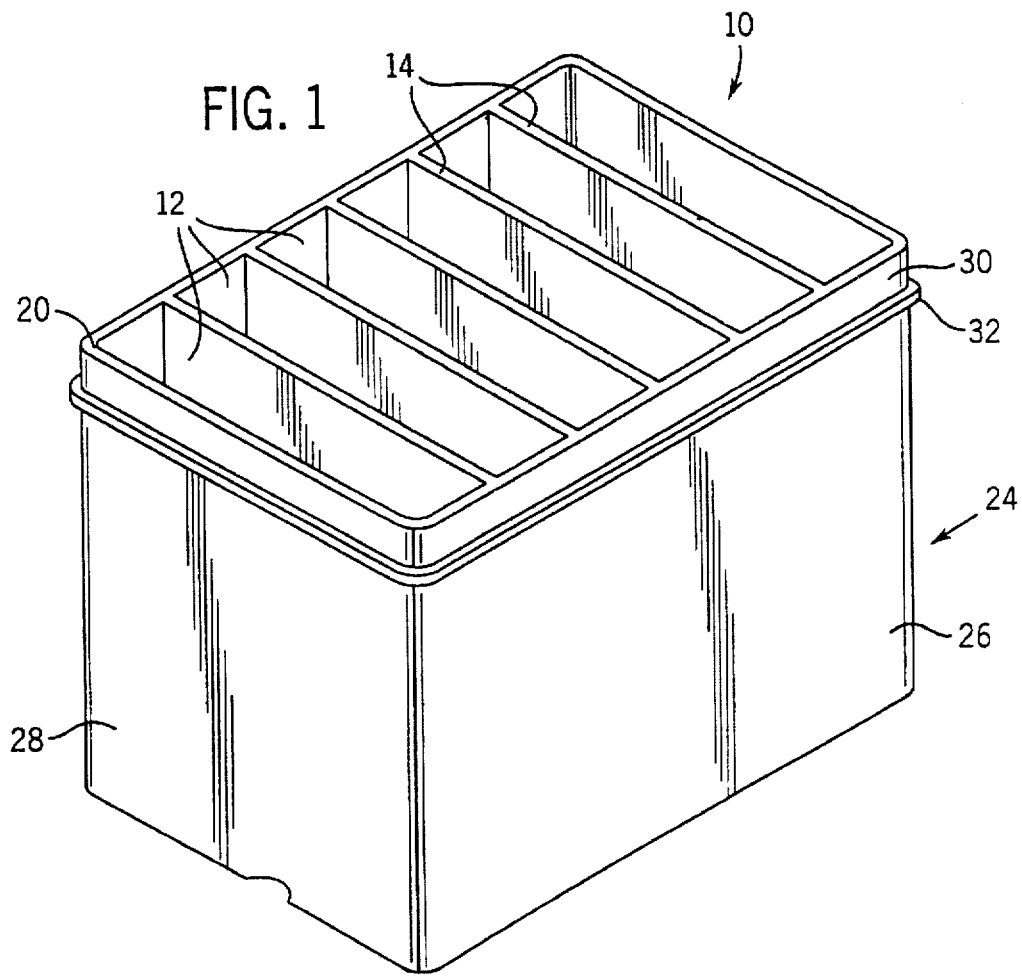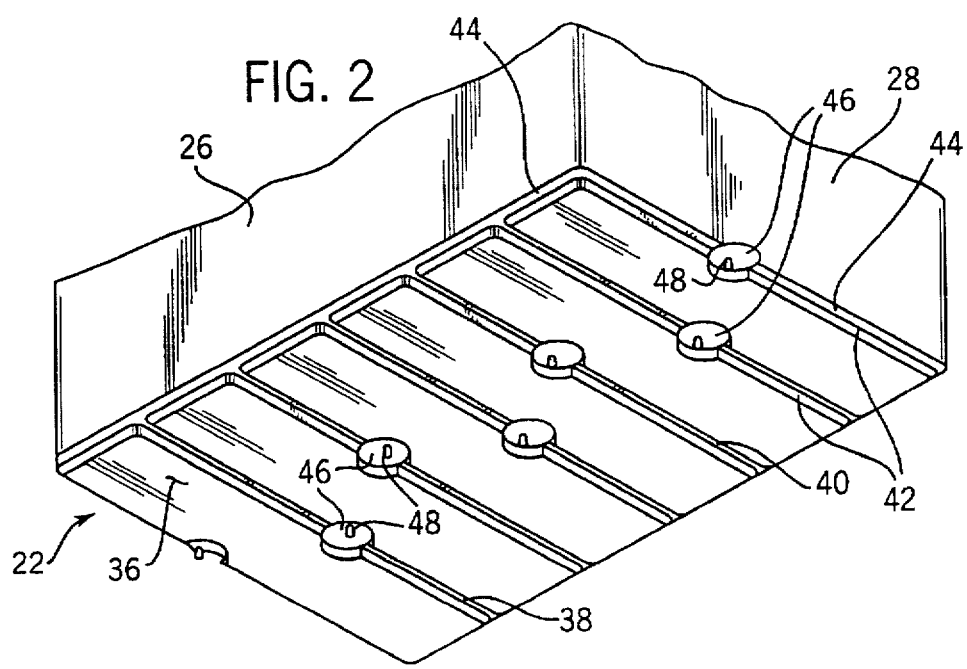

5,711,910

METHOD FOR MAKING A STACKABLE CONTAINER FORMED BY A NOZZLE HAVING AN OFFSET GATE

BACKGROUND OF THE INVENTION

1. Field of the Invention

This invention relates generally to a process for forming a stackable plastic container. More particularly, this invention relates to a process for injection molding stackable battery containers utilizing a hot tip nozzle having an offset gate.

2. Background of the Invention

Stackable multi-cell battery containers are generally manufactured utilizing an injection molding process. The battery containers include an outside wall and a number of partitions which form the cells. The battery container includes a bottom having a number of recesses or grooves configured to match the top of the partitions and walls.

Containers may be vertically stacked for storage and shipping by locating the recesses on top of the partition and walls of a first container. In this manner a number of containers may be stacked.

The battery containers are formed utilizing a molding die in which a number of injection molding nozzles are employed to inject the plastic material. The nozzles are typically located directly under the partitions and external walls. This aids in the flow of plastic into the partition and wall cavities.

With certain stackable containers, such as battery casings, the recesses or depressions may be located within grooves used to facilitate stacking of the casings.

The plastic molded battery container with plastic remnants in the stacking grooves has a few major problems. The gate remnant coins into the partition of the next container when stacked on a pallet. This may result in a depression or the deformation of the partition. Such a deformity could result in a leak between the casing and a top cover, which may ultimately result in a leak in the final assembly. One solution to this problem is to heat the remnants after the product has been molded to flatten the remnant within the depression. This solution requires significant labor costs.

Another problem associated with locating the gate in a stacking groove immediately under a partition wall is the non-uniform rate of cooling. The area immediately under a partition has a relatively heavy cross section, and is subject to the heat from the gate region. The partition wall having a smaller cross section cools at a faster rate than the heavy cross section proximate the gate. As the partition wall cools, material is drawn toward the cooling areas and away from the gate region thereby resulting in voids or pinholes.

Accordingly, it would be desirable to have a stackable battery casing which does not result in the deformation and damage to the partitions. Further, it would be desirable to reduce the voids and pin holes which occur in the gate region as a result of non-uniform cooling.

SUMMARY OF THE INVENTION

The present invention includes a stackable battery container having an outer shell. The outer shell includes a first pair of parallel walls, and a second pair of parallel walls substantially transverse to the first pair of walls. Each of the first and second pairs of walls includes a top edge. The container further includes at least one partition extending between one of the pair of walls. The partition includes a top partition edge. Additionally, a base is integrally formed with the outer shell and has a recessed stacking groove configured to receive the top edges of the partition and first and second pair of walls. A gate depression is centrally located with the stacking groove. A gate remnant is located within and extending from the gate depression offset from the stacking groove.

According to another aspect of the invention, a method for making a thermoplastic, injection-molded, stackable article having at least one recessed region to facilitate stacking includes a number of steps. One step is forming a mold, including a bottom plate, a raised section designed to form the recessed cavity of the stackable article. Another step is locating an injection nozzle centrally within raised portion. A further step includes providing a gate offset from a longitudinal axis of the nozzle to permit flow of a plastic into the cavity at a point offset from the center of the raised section. Still another step includes injecting the recessed cavity with plastic through the gate.

According to still another aspect of the invention, a mold assembly has an interior cavity configured to create a stackable container. The stackable container includes a recessed region that permits stacking of the container on an adjacent container. The mold comprises a bottom plate having at least one raised region and a plurality of core segments and external segments movably engaged with the bottom plate defining the cavity. The mold further includes at least one injection nozzle centrally located within the raised region and extending within the cavity. The nozzle includes a longitudinal axis and a gate offset from the longitudinal axis of the injection nozzle.

According to a further aspect of the invention an injection molding nozzle includes a gate offset from the nozzle center line.

BRIEF DESCRIPTION OF THE DRAWINGS

The invention, together with further objects and advantages thereof, may best be understood by making reference to the following description taken in conjunction with the accompanying drawings, in the several figures of which like reference numerals identify like elements, and wherein:

FIG. 1 is a top isometric view of a battery casing according to a preferred embodiment of the invention;

FIG. 2 is a bottom isometric view of the battery casing of FIG. 1;

DETAILED DESCRIPTION OF THE PREFERRED EMBODIMENTS

Figure 3A:
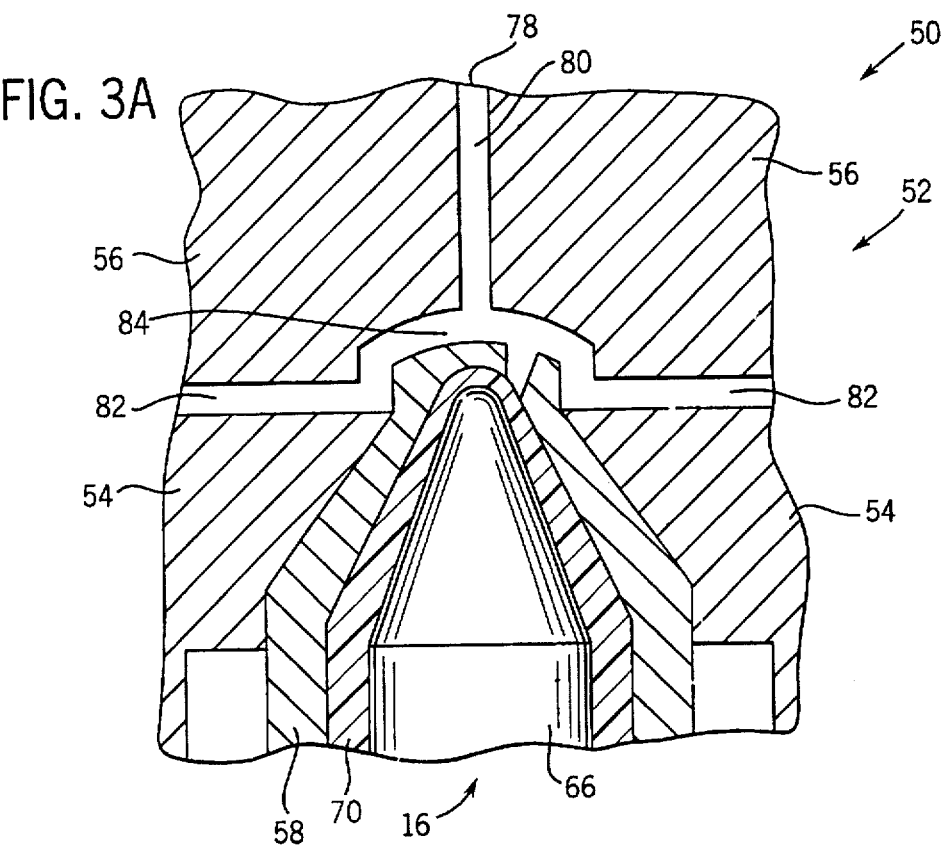
FIG. 3A is a fragmentary cross-sectional view of the injection molding apparatus in an engaged position prior to injection of plastic material.

Referring to FIGS. 1 and 2, a stackable battery casing 10 includes a plurality of cells 12 separated by partition walls 14. Casing 10 is formed with an injection molding process utilizing a hot tip nozzle 16 having an offset gate 18 (see FIG. 4). The apparatus and injection molding process for manufacturing battery casing 10 will be discussed below.

Casing 10 includes a casing top 20, a casing bottom 22, and a generally rectangular outer shell 24. Outer shell 24 includes a first pair of walls 26 and a second pair of walls 28 substantially transverse to first pair of walls 26. Outer shell 24 further includes a cover tongue 30 located proximate casing top 20 in which a cover (not shown) is affixed. A cover tongue band 32 is located adjacent cover tongue 30 distal casing top 20 and extends from outer shell 24.

Each partition 14 extends from casing top 20 to casing bottom 22 and between each of the first pair of walls 26. Partitions 14 are substantially parallel to second pair of walls 28. Each partition 14 has a greater width proximate an inner wall 34 of casing bottom 22 than at casing top 20. Inner wall 34 forms the bottom of each cell 12 (see FIG. 4).

In the preferred embodiment, there are a total of six cells 12, however, the number of cells may be varied based on the specific battery configuration. Casing 10 includes a number of inner cells 12 formed intermediate partitions 14 and a pair of outer cells 12 formed intermediate each of the first pair of walls 26 and an adjacent partition 14.

Casing bottom 22 further includes a base surface 36 and a plurality of recessed regions or stacking grooves 38. Each stacking groove 38 extends intermediate first pair of walls 26 and is co-planar with one partition 14, such that each stacking groove is in substantial alignment with one partition. This permits stacking of the containers as will be described below. Each stacking groove 38 has a groove bottom 40 and a pair of tapered walls 42 angled outward from groove bottom surface 40 to base surface 36. In this manner, the distance between tapered groove walls 42 is greater proximate casing bottom surface 36 than proximate groove bottom 40.

Additionally, casing bottom 22 includes an outer stacking groove 44 proximate first and second pair of walls 26, 28 (see FIG. 2). A gate depression 46 is centrally located along each stacking groove 38 intermediate first pair of walls 26. Gate depression 46 has a hemispherical dome shape. A gate remnant 48 extends from gate depression 46 such that it does not protrude within stacking groove 38 (see FIG. 8).

Figure 7:
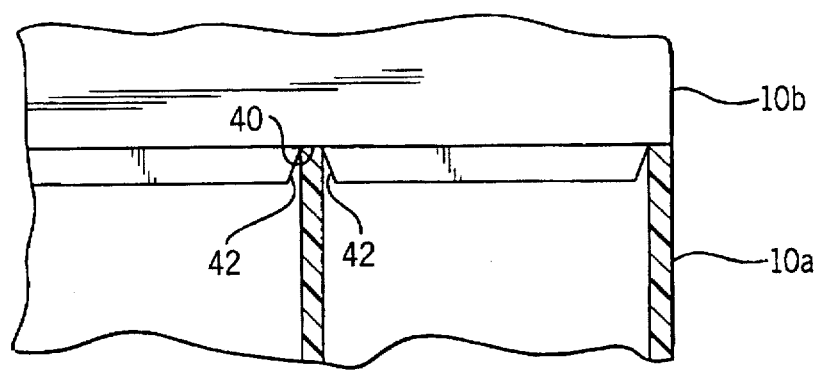
FIG. 7 is a fragmentary cross-sectional view of a pair of stacked battery casings.
Figure 8:
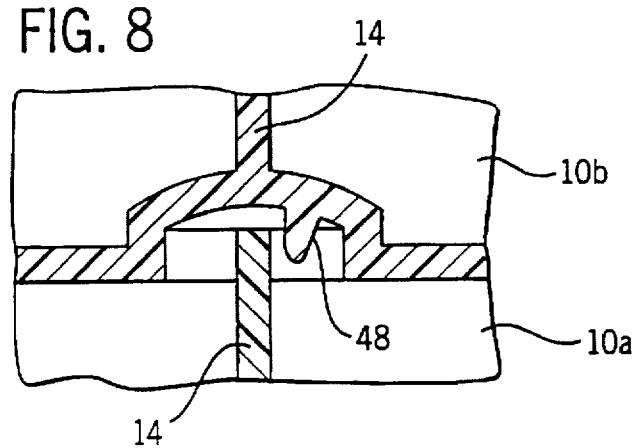
FIG. 8 is a fragmentary cross-sectional view of a pair of stacked battery casings at the gate depression.

Referring to FIGS. 7 and 8 a plurality of casings 10 may be stacked vertically such that top of partitions 14 and top of shell 24 of a first casing 10a support bottom surface 40 of support grooves 38 of an adjacent casing 10b. In this manner a plurality of casings 10 may be vertically stacked. In the stacked position as illustrated in FIG. 8, gate remnant 48 does not interfere with partition 14.

In contrast to the preferred embodiment, a prior art gate remnant 48' is located directly below a partition 14' (see FIG. 6). As a result of variability, an interference between partition 14' (shown in dotted lines) and gate remnant 48' frequently occurs. This problem is substantially reduced in the preferred embodiment, where gate remnant 48 is offset from the partition 14.

Figure 9:
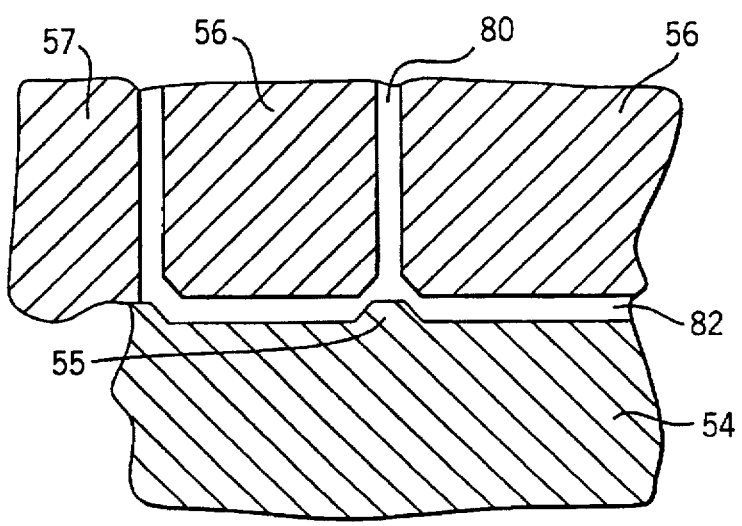
FIG. 9 is a fragmentary cross-sectional view of the bottom plate, core and external segment.

Referring to FIG. 3A an apparatus 50 for injection molding casing 10 will now be described. Apparatus 50 includes a conventional mold 52 having a bottom plate 54, a number of core segments 56, and four side segments 57 (see FIG. 9).

Bottom plate 54 includes a number of raised sections 55 (see FIG. 9) configured to form stacking grooves 38 of casing 10. Bottom plate 54 further includes a plurality of apertures. Each aperture is centrally located within each raised region. One nozzle 16 is located within each aperture of bottom plate 54.

Each nozzle 16 includes a steel shell 58 having a shell tip 60 provided with a hemispherical dome surface 62. Shell tip 60 further includes a shell tip wall 64 extending vertically from dome surface 62. Nozzle 16 includes a torpedo heater 66 located within steel shell 58. Torpedo heater 66 includes a tip 68 located proximate shell tip 60. A plastic channel 70 is defined by the area between heater 66 and steel shell 58.

Gate 18 is located within shell tip 60 connecting the exterior of shell tip 60 with plastic channel 70. Gate 18 has a circular cross section and is offset from a center line 72 of nozzle 16. Gate 18 further includes a gate exit 74 proximate dome surface 62 and a gate entrance 76 in communication with plastic channel 70. Gate 18 is tapered such that the circumference of gate 18 is greater at gate exit 74 than at gate entrance 76.

Referring generally to FIG. 3A, mold 52 is in an engaged position. In this position, bottom plate 54, shell tip 60 of nozzle 16, side segments 57, and core segments 56 define a cavity 78 having the form of casing 10. More specifically, cavity 78 includes a partition cavity region 80 defined by the area between adjacent core segments 56 which have the form of partitions 14. Additionally, second pair of walls 28 are formed from a cavity region formed between core segments 56 and the side segments 57. Similarly, a base cavity region 82 is defined by the area between bottom plate 54 and core segments 56. Additionally, a depression cavity region 84 is defined by the area between shell tip 60 and core segments 56 which forms hemispherical gate depression 46.

Figure 3B:
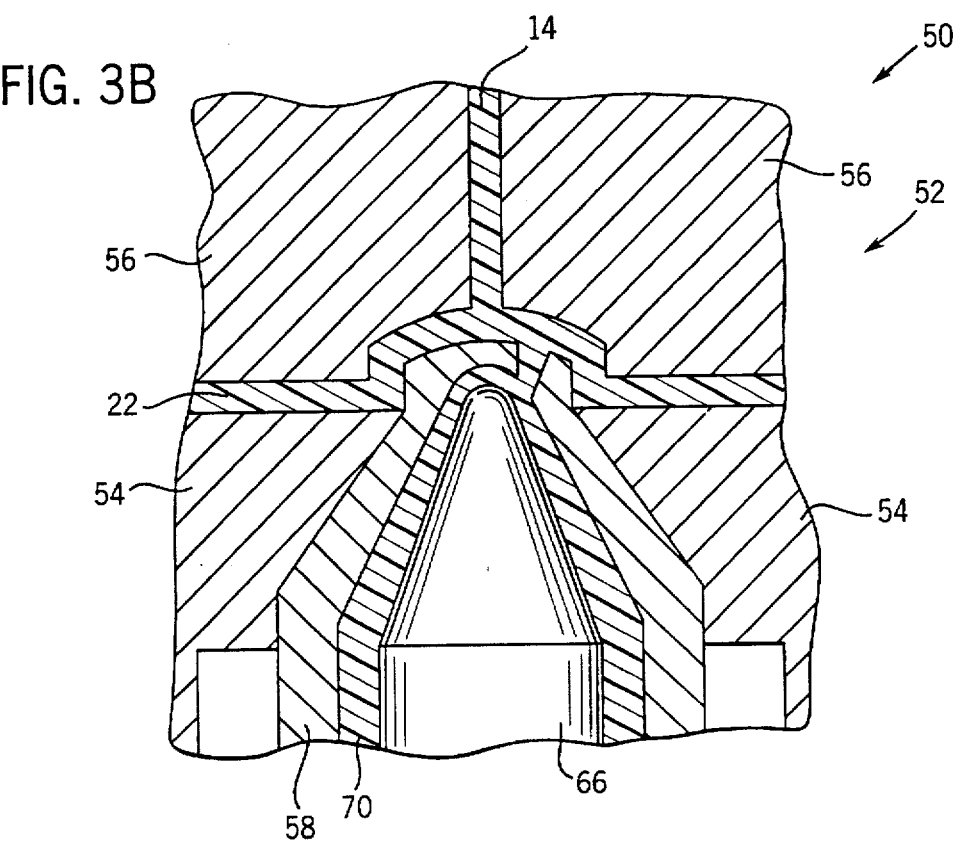
FIG. 3B is a fragmentary cross-sectional view of the injection molding apparatus in an engaged position subsequent to the injection of plastic material.
Figure 4:
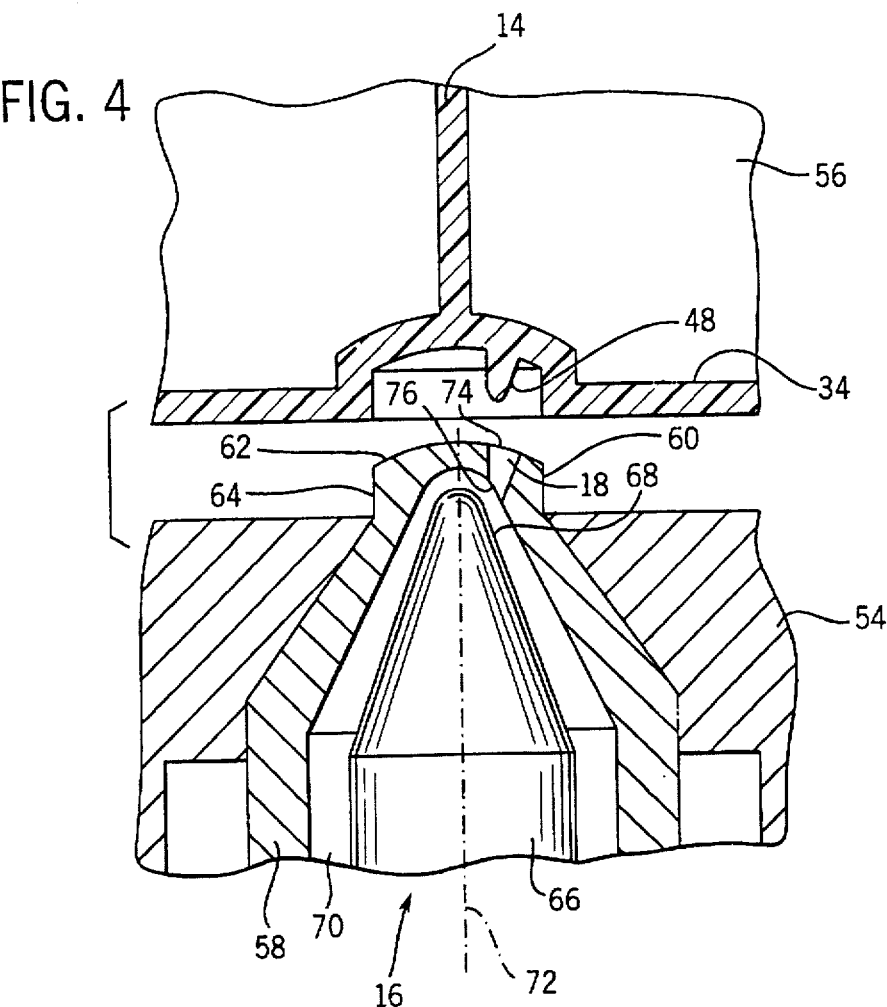
FIG. 4 is an exploded fragmentary cross-sectional view of the injection molding apparatus of FIG. 3 in the disengaged position.

Referring generally to FIGS. 3B and 4 the method of forming a stackable battery casing 10 will be described. A thermoplastic material is forced through plastic channel 70 in hot tip nozzle 16 and injected into cavity 78 through offset gate 18. Once cavity 78 has been filled with plastic, bottom plate 54 is separated from core segments 56 and side segments 57. As bottom plate 54 is separated, gate remnant 48 is formed from the plastic material within gate 18. In this manner casing 10 is formed with a gate remnant 48 located in each gate depression 46 offset from stacking groove 38. The taper of gate 18 aids in the removal of plastic material from the gate and the formation of gate remnant 48.

Figure 5:
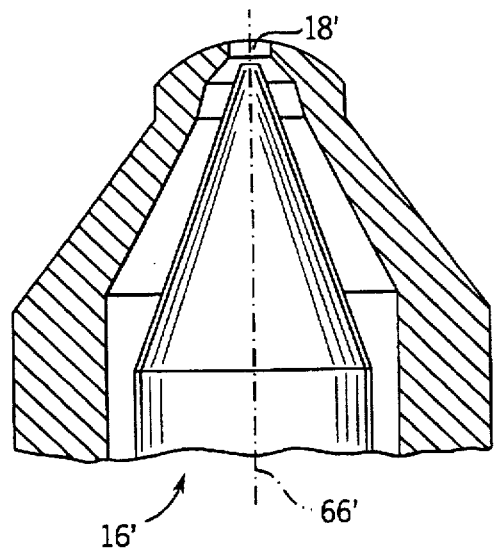
FIG. 5 is a cross-sectional view of a conventional injection molding nozzle.
Figure 6:
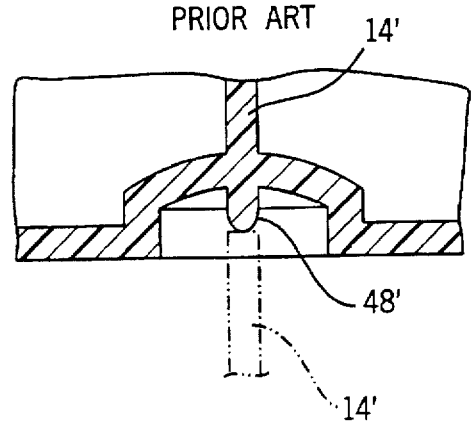
FIG. 6 is a fragmentary cross-sectional view of a conventional gate depression of a battery casing.

Referring to FIGS. 5 and 6, a conventional nozzle included a gate 18' located along a longitudinal axis 66'. Prior art gate 18' was located immediately below cavity 80 within the mold. As the bottom plate of the prior art mold was removed, a gate remnant 48' would form directly below formed partition 14'. In addition to the central location of the gate, partition 14' would cool quicker than the area immediately surrounding gate 18'. As a result plastic would be drawn toward partition 14' often resulting in a void or pin hole.

In contrast, gate 18 of the preferred embodiment, as illustrated in FIGS. 3B and 4, is offset from and located proximate core 56, which is water cooled. In this configuration a more uniform cooling rate is provided, thereby reducing the occurrence of voids and pin holes.

An injection molding process utilizing a standard hot tip nozzle with a centrally located gate can be modified at nominal cost. By altering the location of the gate from a central location to an offset location, it is possible to modify existing systems without the necessity of re-tooling the mold to alter the location of the nozzles themselves.

It will be understood that the foregoing description is of a preferred exemplary embodiment of this invention and that the invention is not limited to the specific form shown. For example, casing 10 may include a number of cells 14 greater than or less than six as illustrated. Additionally, shell tip 60 may have other forms such as a generally square form. Also, gate 18 may have a different cross section or rate of taper than that illustrated.

Further, a variety of stackable casings and components may benefit from the present invention for example numerous types of molds and a variety of injectors may be used as would be known to one of ordinary skill in the art. These and other modifications may be made in the design and arrangement of the elements without departing from the scope of the invention as expressed in the appended claims.

What is claimed is:

1. A method for making a thermoplastic injection molded stackable article, having at least one recessed region to facilitate stacking of the article on a next adjacent article, comprising the steps of:

forming a mold including a bottom plate and a plurality of core segments and side segments, the bottom plate having a raised section designed to form the recessed region of the stackable article, the bottom plate and plurality of core and side segments defining a cavity;

locating an injection nozzle centrally within the raised section, the injection nozzle having a center line coincident with a center of the raised section;

providing a gate offset from the center line of the nozzle to permit flow of a plastic into the cavity at a point offset from the center of the raised section;

injecting the cavity with plastic through the gate; and forming a gate remnant offset from the center of the recessed region.

2. The method of claim 1, wherein the step of injecting includes injecting a thermoplastic.

3. The method of claim 2, further comprising the step of positioning the gate toward a water cooled region of the die.

4. The method of claim 3, further comprising the step of cooling the stackable article.

5. The method of claim 4, further comprising the step of removing the stackable article from the mold.

6. The method of claim 1, wherein the step of providing a gate includes the step of providing a gate having a gate entrance communicating with a plastic channel of the injection nozzle and a gate exit communicating with an exterior of the injection nozzle, wherein the cross section of the gate exit is greater than the cross section of the gate entrance.

\* \* \* \* \*